(12) United States Patent
Raza

(10) Patent No.: US 6,665,265 B1
(45) Date of Patent: Dec. 16, 2003

(54) OVERHEAD SERIAL COMMUNICATION SCHEME

(75) Inventor: S. Babar Raza, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/435,749

(22) Filed: Nov. 8, 1999

Related U.S. Application Data

(60) Provisional application No. 60/109,505, filed on Nov. 23, 1998.

(51) Int. Cl.$^7$ ................................................ H04L 1/06
(52) U.S. Cl. ........................................ 370/231; 710/55
(58) Field of Search ....................... 370/231; 375/242; 714/709, 745; 709/101; 710/55

(56) References Cited

U.S. PATENT DOCUMENTS

| | | | | |
|---|---|---|---|---|
| 3,763,758 A | | 10/1973 | Manack et al. ............... 219/216 |
| 4,534,025 A | * | 8/1985 | Floyd .......................... 370/449 |
| 4,980,887 A | * | 12/1990 | Dively et al. ................. 714/713 |
| 5,029,183 A | * | 7/1991 | Tymes .......................... 375/141 |
| 5,103,461 A | * | 4/1992 | Tymes .......................... 375/141 |
| 5,157,687 A | * | 10/1992 | Tymes .......................... 375/140 |
| 5,189,671 A | * | 2/1993 | Cheng .......................... 370/471 |
| 5,349,588 A | * | 9/1994 | Schellinger ................... 714/778 |
| 5,432,775 A | * | 7/1995 | Crayford ...................... 370/248 |
| 5,461,622 A | | 10/1995 | Bleickardt et al. ........... 370/470 |
| 5,668,803 A | * | 9/1997 | Tymes et al. ................. 370/312 |
| 5,740,189 A | * | 4/1998 | Tiedje .......................... 714/807 |
| 5,898,674 A | * | 4/1999 | Mawhinney et al. ........ 370/247 |
| 6,061,365 A | * | 5/2000 | Yeung et al. ................. 370/470 |
| 6,161,198 A | * | 12/2000 | Hill et al. ....................... 714/15 |
| 6,263,443 B1 | | 7/2001 | Anderson et al. ............ 713/160 |
| 6,298,038 B1 | | 10/2001 | Martin et al. ................ 370/216 |
| 6,502,197 B1 | | 12/2002 | Raza ............................ 713/400 |

OTHER PUBLICATIONS

Practical Data Communications, by Roger L. Freeman, 1995, pp. 433–448.

* cited by examiner

*Primary Examiner*—Hassan Kizou
*Assistant Examiner*—Dmitry Levitan
(74) *Attorney, Agent, or Firm*—Christopher P. Maiorana, P.C.

(57) ABSTRACT

A method of validating data between a path generator and a path processor, comprising the steps of (A) transmitting validation data from said path generator to said path processor on a data path, (B) sequentially transmitting data on said data path, (C) determining if the transmitted data is valid in response to the validation data and (D) using the overhead data by the processor when the overhead data is validated by the validation data.

18 Claims, 2 Drawing Sheets

OVERHEAD SERIAL COMMUNICATION SCHEME

The present application claims the benefit of provisional application Serial No. 60/109,505, filed Nov. 23, 1998 and is hereby incorporated by reference in its entirety.

CROSS-REFERENCE TO RELATED APPLICATIONS

The present application may be related to Ser. No. 09/436,314, now U.S. Pat. No. 6,502,197, filed concurrently and is hereby incorporated by reference in its entirety.

FIELD OF THE INVENTION

The present invention relates to circuits for validation of overhead bytes generally and, more particularly, to a method and an architecture for serial communication between an overhead generator and an overhead processor for such validation.

BACKGROUND OF THE INVENTION

Referring to FIG. 1, a conventional circuit 10 is shown comprising an overhead processor 12, an overhead generator 14 and an overhead interface 16. The overhead processor 12 may receive or generate a number of signals TOH (transport overhead), TOHEN (transmit overhead enable), TOHCLK (transmit overhead clock), TPOHFP (transmit path overhead frame pulse) and TTOHFP (transmit transport overhead frame pulse) for transferring overhead bytes from the overhead generator 14 to the overhead processor 12. Generally, the signal TOH is the data for transmit, the signal TOHCLK is the clock for the overhead interface 16, the signal TTOHFP is the start of the frame from the overhead processor 12, and the signal TPOHFP is the payload indicator from the overhead processor 12. The signal TOHEN is an indicator received from the path overhead generator 14 indicating whether the current path overhead bytes should be used or not.

FIG. 2 shows the waveform for communication typical of the approach described above with respect to FIG. 1. As seen in FIG. 2, when the signal TOHEN is asserted on the first bit of the incoming overhead byte (i.e., TOH1, TOHEN), the overhead processor 12 recognizes the signal TOHEN as indicating that a valid overhead byte is to be used as the frame of a SONET device. When the signal TOHEN pin is de-asserted (i.e., TOH2) during the first bit of the overhead byte, the overhead processor 12 recognizes the overhead byte as not valid and uses the default value stored inside the overhead processor 12.

As shown in the description above, this previous approach uses a separate pin to communicate the validation of the overhead byte.

SUMMARY OF THE INVENTION

The present invention concerns a method of validating data between a path generator and a path processor, comprising the steps of (A) transmitting validation data from said path generator to said path processor on a data path, (B) sequentially transmitting data on said data path, (C) determining if the transmitted data is valid in response to the validation data and (D) using the overhead data by the processor when the overhead data is validated by the validation data.

Another aspect of the present invention concerns a circuit for validating overhead bytes comprising a data pin and a processor. The data pin may be configured to sequentially transmit one or more validation bits and an overhead data. The processor may be configured to determine if the transmitted overhead data is valid with respect to a previously sequentially transmitted validation data.

The objects, features and advantages of the present invention include a method and architecture that may provide (i) in-band signaling to communicate validation of overhead bytes, (ii) in-band communication in a serial communication scheme, and/or (iii) in-band communication without implementing a separate pin for such validation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention concerns a method and architecture for validation of overhead bytes using a serial communication scheme between an overhead generator and an overhead processor. A particular pattern received at a pin (e.g., TPOH—transmit path overhead) as the interface between the overhead generator and the overhead processor may frame and/or validate a data package transferred at the interface and may eliminate any need for another pin dedicated to such framing and/or validation. Validation bits may be transmitted on the pin, which may be followed by sequential serial transmission of the overhead data bytes. For each row of a SONET frame, payload data may be transmitted after several (e.g., three) overhead data bytes have been transmitted. The processor may be configured to determine if the overhead bytes are valid for the previously sequentially transmitted validation bits and may complete or accept their transfer of the overhead bytes if valid or ignore the overhead bytes if not valid.

Figure 1:
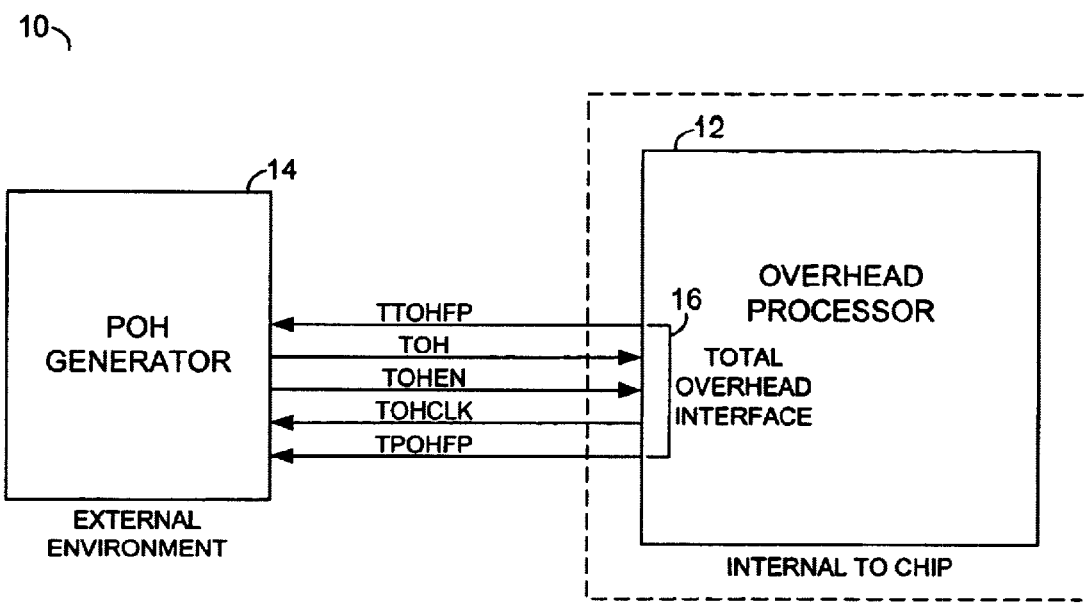
FIG. 1 is a block diagram of an approach using a TOHEN pin for the validation signal received from a path overhead generator.
Figure 2:
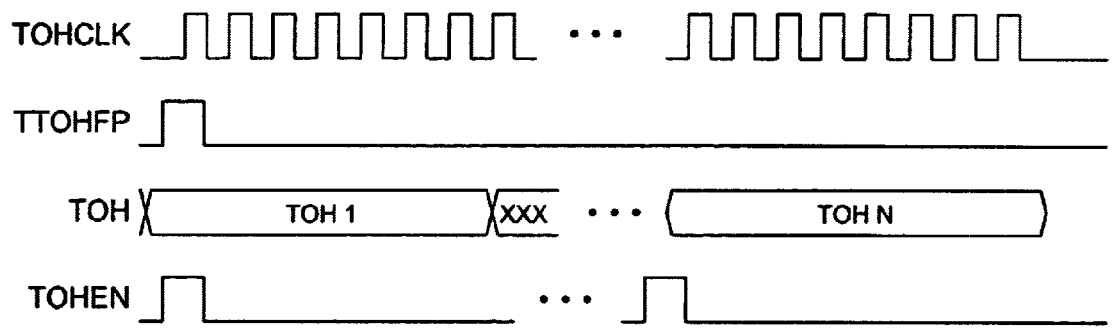
FIG. 2 is a timing diagram of the signal waveforms characteristic of the approach illustrated in FIG. 1.
Figure 3:
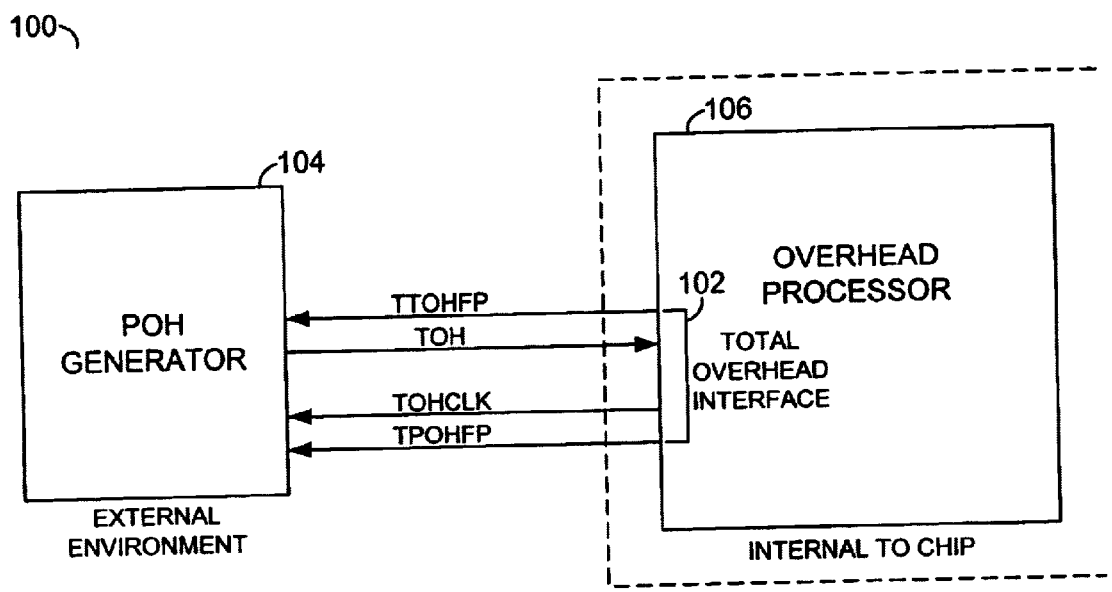
FIG. 3 is a block diagram of the present invention for serial communication for validation of overhead bytes.

Referring to FIG. 3, a circuit 100 is shown in accordance with a preferred embodiment of the present invention. The circuit 100 generally comprises an overhead interface 102, a path generator (e.g., a path overhead generator) 104, and a processor (e.g., a path overhead processor) 106. The circuit 100 may use a pin (e.g., TOHCLK) as a clock for the overhead interface 102, a pin (e.g., TTOHFP) as the start of the frame from an overhead processor 106 and a pin (e.g., TPOHFP) as the payload indicator from the overhead processor 104. The circuit 100 may eliminate implementing a separate pin for indicating the usability of the current path overhead bytes (e.g., TOHEN). Instead, the circuit 100 may use a data pin (e.g., TOH) to communicate validation information in addition to the transfer of data.

Figure 4:
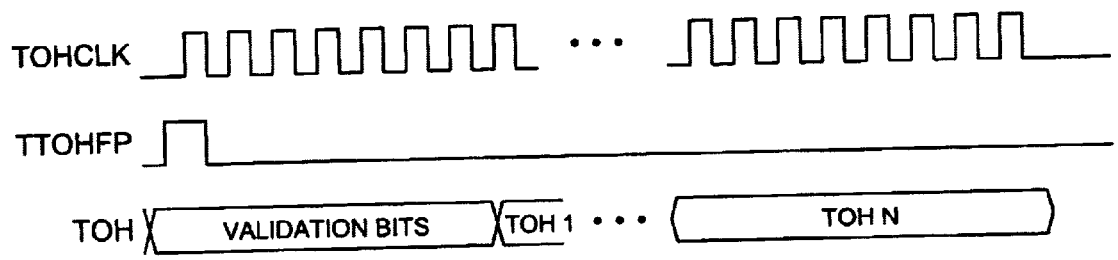
FIG. 4 is a timing diagram illustrating signal waveforms characteristic of the present invention.

FIG. 4 illustrates the waveform characteristic of the interface 102 of the circuit 100. As shown in FIG. 4, the validation bits for each overhead byte may be sent first and then the overhead bytes may be sent sequentially. If the transmitted validation bits match a predetermined pattern, and thus are appropriate (e.g., valid) for the particular sequentially (or alternately, subsequently) transmitted overhead byte(s), the processor 106 generally uses (e.g., accepts) the particular valid overhead byte. If the transmitted validation bits are inappropriate (e.g., not valid) for the next bit, the processor 106 generally ignores the next byte. The processor 106 may contain suitable logic circuitry and/or memory to perform such a matching function. The number of validation bits may be a number n, where n is an integer.

The method and architecture of the present invention may use of in-band signaling to communicate validation of overhead bytes. The present invention may allow the elimination of one additional pin in the overhead interface 102, with appropriate savings of chip real estate and related expense.

While the invention has been particularly shown and described with reference to the preferred embodiments thereof, it will be understood by those skilled in the art that various changes in form and details may be made without departing from the spirit and scope of the invention.

What is claimed is:

1. A method of validating data between a path generator and a path processor, comprising the steps of:
    (A) transmitting validation data and overhead data from said path generator to said path processor on a first data path;
    (B) transmitting data on said first data path after transmitting said overhead data;
    (C) transmitting a clock signal on a second data path;
    (D) validating said validation data against a predetermined pattern; and
    (E) using said overhead data by said path processor in response to said overhead data being valid.

2. The method according to claim 1, wherein said path generator comprises a path overhead generator for a SONET system.

3. The method according to claim 1, wherein said path processor comprises a path overhead processor for a SONET system.

4. The method according to claim 1, wherein said validation data comprises one or more validation bits.

5. The method according to claim 1, wherein said method comprises in-band signaling to communicate said overhead data.

6. The method according to claim 1, further comprising the step of:
    transmitting a frame signal on a third data path to frame a data package comprising said validation data.

7. The method according to claim 1, wherein said step (D) comprises the sub-step of:
    ignoring said overhead data in response to said overhead data being invalid.

8. A circuit comprising:
    a path generator configured to transmit (i) validation data and overhead data and then (ii) data on a first pin and transmit a clock signal on a second pin; and
    a path processor configured to (i) validate said validation data against a predetermined pattern and (ii) use said overhead data in response to said validation data being valid.

9. The circuit according to claim 8, wherein said path generator is further configured to receive a frame signal on a third pin framing a data package comprising said validation data.

10. An apparatus for validating overhead bytes comprising:
    means for transmitting validation data and an overhead data on a first data path;
    means for transmitting data on said first data path after transmitting said overhead data;
    means for transmitting a clock signal on a second data path;
    means for validating said validation data against a predetermined pattern; and
    means for using said overhead data in response to said validation data being valid.

11. The method according to claim 1, further comprising the step of:
    transmitting a payload signal on a third data path to indicate a start of said data.

12. The circuit according to claim 8, wherein said path generator comprises a path overhead generator for a SONET system.

13. The circuit according to claim 8, wherein said path processor comprises a path overhead processor for a SONET system.

14. The circuit according to claim 8, wherein said validation data comprises:
    at least one validation bit.

15. The circuit according to claim 8, wherein said path generator is further configured to:
    communicate said overhead data using in-band signaling.

16. The circuit according to claim 8, wherein said path processor is further configured to:
    ignore said overhead data in response to said overhead data being invalid.

17. The circuit according to claim 8, wherein said path processor is further configured to:
    transmit a payload signal on a third pin to indicate a start of said data.

18. The circuit according to claim 8, wherein said path generator is disposed external to a chip comprising said path processor.

* * * * *